United States Patent
Viola et al.

(10) Patent No.: US 7,639,881 B2
(45) Date of Patent: *Dec. 29, 2009

(54) APPLICATION OF GRAMMATICAL PARSING TO VISUAL RECOGNITION TASKS

(75) Inventors: Paul A. Viola, Kirkland, WA (US); Michael Shilman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

This patent is subject to a terminal disclaimer.

(21) Appl. No.: 11/151,708

(22) Filed: Jun. 13, 2005

(65) Prior Publication Data

US 2006/0280370 A1    Dec. 14, 2006

(51) Int. Cl.
*G06K 9/00* (2006.01)
*G06K 9/34* (2006.01)
*G06K 9/62* (2006.01)
*G06K 9/72* (2006.01)

(52) U.S. Cl. .............. 382/226; 382/112; 382/180; 382/209; 382/229

(58) Field of Classification Search ............. 382/226, 382/112, 180, 181, 229, 209
See application file for complete search history.

(56) References Cited

U.S. PATENT DOCUMENTS 5,020,112 A * 5/1991 Chou ................. 382/226
2007/0055662 A1 * 3/2007 Edelman et al. ........... 707/6

OTHER PUBLICATIONS

C. D. Manning, et al., Foundations of Statistical Natural Language Processing. The MIT Press, 1999.

Tobias Schefer, et al., Active Hidden Markov Models For Information Extraction. In Advances in Intelligent Data Analysis, 4th International Conference, IDA 2001, 2001.

P. Chou, "Recognition Of Equations Using A 2-D Stochastic Context-Free Grammar," in SPIE Conference on Visual Communications and Image Processing, Philadelphia, PA, 1989.

M. Kay, "Algorithm Schemata And Data Structures In Syntactic Processing," pp. 35-70, 1986.

Michael Shilman, et al., Spatial Recognition And Grouping Of Text And Graphics, Eurographics Workshop On Sketch-Based Interfaces And Modeling, 2004.

Michael Shilman, et al., Recognition And Grouping Of Handwritten Text In Diagrams And Equations, IWFHR 2004, Sep. 2004, Toyko, Japan.

Vinajak R. Borkar, et al., Automatically extracting structure from free text addresses, 2000, In Bulletin of the IEEE Computer Society Technical committee on Data Engineering. IEEE.

(Continued)

*Primary Examiner*—John B Strege
(74) *Attorney, Agent, or Firm*—Lee & Hayes, PLLC

(57) ABSTRACT

Image recognition is utilized to facilitate in scoring parse trees for two-dimensional recognition tasks. Trees and subtrees are rendered as images and then utilized to determine parsing scores. Other instances of the subject invention can incorporate additional features such as stroke curvature and/or nearby white space as rendered images as well. Geometric constraints can also be employed to increase performance of a parsing process, substantially improving parsing speed, some even resolvable in polynomial time. Additional performance enhancements can be achieved in yet other instances of the subject invention by employing constellations of integral images and/or integral images of document features.

20 Claims, 12 Drawing Sheets

OTHER PUBLICATIONS

Remco Bouckaert, Low level information extraction: A bayesian network based approach, 2002, In Proc. TextML 2002, Sydney, Australia.

Claire Cardie, et al., Proposal for an interactive environment for information extraction, 1998, Technical Report TR98-1702, 2.

Rich Caruana, et al., High precision information extraction, Aug. 2000, In KDD-2000 Workshop on Text Mining.

M. Collins, Discriminative training methods for hidden nnarkov models : Theory and experiments with perceptron algorithms, 2002, In Proceedings of Empirical Methods in Natural Language Processing (EMNLP02).

Corinna Cortes, et al., Support-vector networks. Machine Learning, 1995, 20(3):273{297.

Y. Freund, et al., Large margin classification using the perceptron algorithm, Machine earning, 37(3):277{296.

Y. Freund, et al., Experiments with a new boosting algorithm, 1996, In International Conference on Machine Learning, pp. 148{156.

T. Kristjansson, et al., Interactive information extraction with constrained conditional random fields, 2004, In Proceedings of the 19th international conference on artificial intelligence, AAAI, pp. 412{418.

John Lafferty, et al., Conditional random fields: Probabilistic models for segmenting and labeling sequence data, 2001, In Proc. 18th International Conf. on Machine Learning, pp. 282{289. Morgan Kaufmann, San Francisco, CA.

M. Marcus, et al., The penn treebank: Annotating predicate argument structure, 1994.

Andrew McCallum, Efficiently inducing features of conditional random fields, 2003, In Nineteenth Conference on Uncertainty in Artificial Intelligence (UAI03).

Andrew McCallum, et al., Early results for named entity recognition with conditional random fields, feature induction and web-enhanced lexicons, 2003, In Marti Hearst and Mari Ostendorf, editors, HLT-NAACL, Association for Computational Linguistics, Edmonton, Alberta, Canada.

Kamal Nigam, et al., Using maximum entropy for text classification, 1999, In IJCAI'99 Workshop on Information Filtering.

David Pinto, et al., Table extraction using conditional random fields, 2003, In Proceedings of the ACM SIGIR.

L.R. Rabiner, A tutorial on hidden markov models and selected applications in speech recognition, 1989, In Proc. of the IEEE, vol. 77, pp. 257{286.

Fei Sha, et al., Shallow parsing with conditional random fields. In Marti Hearst and Mari Ostendorf, editors, 2003, HLT-NAACL: Main Proceedings, pp. 213{220, Association for Computational Linguistics, Edmonton, Alberta, Canada.

J. Stylos, et al., Citrine:providing intelligent copy-and-paste, 2005, In Proceedings of ACM Symposium on User Interface Software and Technology (UIST 2004), pp. 185{188.

B. Tasker, et al., Max-margin parsing, 2004, In Empirical Methods in Natural Language Processing (EMNLP04).

S. Mao, et al., Document structure analysis algorithms: A literature survey, Jan. 2003, vol. 5010, pp. 197-207, In Proc. SPIE Electronic Imaging.

M. Krishnamoorthy, et al., Syntactic segmentation and labeling of digitized pages from technical journals, 1993, IEEE Transactions on Pattern Analysis and Machine Intelligence. vol. 15, pp. 737-747.

J. Kim, et al., Automated labeling in document images, Jan. 2001, In Document Recognition and Retrieval VIII, vol. 4307.

D. Niyogi, et al., Knowledge-based derivation of document logical structure, 1995, In Third International Conference on Document Analysis and Recognition, Montreal, Canada.

A. Conway, Page grammars and page parsing. A syntactic approach to document layout recognition, 1993, in Proceedings of the Second International Conference on Document Analysis and Recognition. Tsukuba Science City, pp. 761-764. Japan.

E. G. Miller, et al., Ambiguity and constraint in mathematical expression recognition, 1998, In Proceedings of the National Conference of Artificial Intelligence. American Association of Artificial Intelligence.

T. Tokuyasu, et al., Turbo recognition: a statistical approach to layout analysis, 2001, in Proceedings of the SPIE, pp. 123-129, vol. 4307, San Jose, CA.

T. Kanungo, et al., Stochastic language model for style-directed physical layout analysis of documents, 2003, In IEEE Transactions on Image Processing, vol. 5, No. 5.

D. Blostein, et al., Applying compiler techniques to diagram recognition, 2002, In Proceedings of the Sixteenth International Conference on Pattern Recognition, pp. 123-136, vol. 3, 2002.

J. F. Hull, Recognition of mathematics using a two dimensional trainable context-free grammar, Jun. 1996, Master's thesis, MIT.

N. Matsakis, Recognition of handwritten mathematical expressions, May 1999, Master's thesis, Massachusetts Institute of Technology, Cambridge, MA.

J. Lafferty, et al., Conditional random fields: Probabilistic models for segmenting and labeling sequence data, 2001, in Proc. 18th International Conf. on Machine Learning, pp. 282-289, Morgan Kaufmann, San Francisco, CA.

E. Charniak, et al., Edge-based best-first chart parsing, 1998, In Proceedings of the Fourteenth National Conference on Artificial Intelligence, pp. 127-133.

D. Klein, et al., A* parsing: Fast exact viterbi parse selection, 2001, Stanford University, Tech. Rep. dbpubs/2002-16.

Y. Freund, et al., A decision-theoretic generalization of on-line learning and an application to boosting, 1995, In Computational Learning Theory: Eurocolt '95, Springer-Verlag, pp. 23-37.

I. Philips, et al., Cd-rom document database standard, 1993, in Proceedings of 2nd International Conference on Document Analysis and Recognition.

P. Viola, et al., Rapid object detection using a boosted cascade of simple features, 2001, In Proceedings of the IEEE Conference on Computer Vision and Pattern Recognition.

T. Breuel, High performance document layout analysis, in 2003 Symposium on Document Image Understanding Technology, Greenbelt Maryland.

R. Zanibbi, et al., A survey of table recognition: Models, observations, transformations, and inferences, 2004, International Journal of Document Analysis and Recognition, pp. 1-16, vol. 7, No. 1.

K.-F. Chan, et al., Mathematical expression recognition: a survey, 2000, International Journal on Document Analysis and Recognition, pp. 3-15, vol. 3.

E. Charniak, Statistical techniques for natural language parsing, 1997, AI Magazine.

M. Kay, Chart generation, 1996, in Proceedings of the 34th conference on Association for Computational Linguistics. Association for Computational Linguistics, pp. 200-204.

M. Viswanathan, et al., Document recognition: an attribute grammar approach, Mar. 1996, In Proc. SPIE vol. 2660, p. 101-111, Document Recognition III, Luc M. Vincent; Jonathan J. Hull; Eds., pp. 101-111.

* cited by examiner

APPLICATION OF GRAMMATICAL PARSING TO VISUAL RECOGNITION TASKS

BACKGROUND

As technology progresses, people become more dependent on computers to help with both work and leisure activities. However, computers operate in a digital domain that requires discrete states to be identified in order for information to be processed. This is contrary to humans who function in a distinctly analog manner where occurrences are never completely black or white. Thus, a central distinction between digital and analog is that digital requires discrete states that are disjunct over time (e.g., distinct levels) while analog is continuous over time. As humans naturally operate in an analog fashion, computing technology has evolved to alleviate difficulties associated with interfacing humans to computers (e.g., digital computing interfaces) caused by the aforementioned temporal distinctions.

Technology first focused on attempting to input existing typewritten or typeset information into computers. Scanners or optical imagers were used, at first, to "digitize" pictures (e.g., input images into a computing system). Once images could be digitized into a computing system, it followed that printed or typeset material should also be able to be digitized. However, an image of a scanned page cannot be manipulated as text or symbols after it is brought into a computing system because it is not "recognized" by the system, i.e., the system does not understand the page. The characters and words are "pictures" and not actually editable text or symbols. To overcome this limitation for text, optical character recognition (OCR) technology was developed to utilize scanning technology to digitize text as an editable page. This technology worked reasonably well if a particular text font was utilized that allowed the OCR software to translate a scanned image into editable text.

However, if more complex elements were scanned in, such as equations or documents with enhanced structures (e.g., double columns, embedded pictures, etc.), traditional OCR techniques required extreme computational power to process these types of scans into recognizable matter, if processible at all. One reason for this increased difficulty is that, for example, equations tend to have complex patterns and orientations that do not fit easily into database oriented recognition systems such as those that utilize text recognition via utilization of font databases. It becomes extremely difficult, if not impossible, to store every possible equation element in a retrievable database. And, even if it was possible, the size of the database would greatly impact retrieval times of information utilized by the traditional recognition system. This issue applies equally well to document analysis and recognition as well as other two-dimensional recognition tasks.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates generally to recognition, and more particularly to systems and methods that employ grammatical parsing to facilitate in visual recognition tasks. Image recognition is leveraged to facilitate in scoring parse trees for two-dimensional recognition tasks. Trees and subtrees are rendered as images and then utilized to determine parsing scores. Other instances of the subject invention can incorporate additional features such as stroke curvature and/or nearby white space as rendered images as well. Geometric constraints can also be employed to increase performance of a parsing process, substantially improving parsing speed, some even resolvable in polynomial time. Additional performance enhancements can be achieved in yet other instances of the subject invention by employing constellations of integral images and/or integral images of document features. By employing a constellation of integral images, integral images for page elements (e.g., word, line, etc.), for example, can be computed rather than a single integral image for an entire page of a document. Integral images of document features can include, for example, large white space rectangles, vertical alignments of bounding boxes, and/or horizontal alignments of text lines. Thus, instances of the subject invention facilitate in providing expedient means to analyze and recognize documents and the like.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

Figure 1:
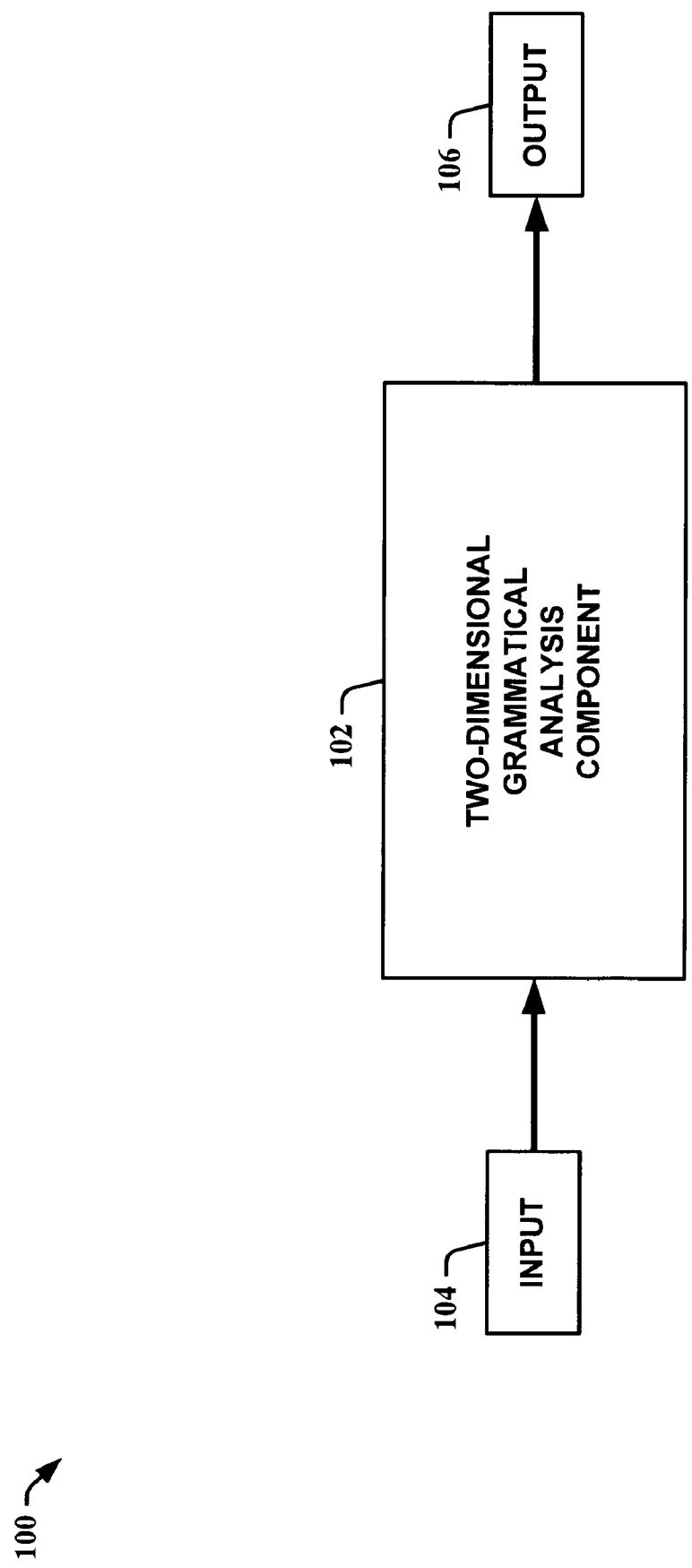
FIG. 1 is a block diagram of a two-dimensional grammatical analysis system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Systems and methods are provided for facilitating grammatical parsing of visual recognition tasks such as, for example, equations, document structures, and/or other two-dimensional recognition tasks and the like. Parsing (or grammatical modeling) is a well known approach for processing computer languages and natural languages. In the case of computer languages, the grammar is unambiguous and given the input there is one and only one valid parse. In the case of natural languages, the grammar is ambiguous and given the input sequence there are a very large number of potential parses. The desire in statistical natural language parsing is to employ machine learning to yield a scoring function which assigns the highest score to the correct parse. Many types of structured layout processing problems such as, for example, document processing, can be viewed as a parsing task with a grammar utilized to describe a set of all possible layout structures.

A grammar based approach selects a global description of the page from several competing descriptions based on a global figure of merit. The local interpretation which maximizes the global score is selected. This provides a principled technique for globally integrating local measurements and handling local ambiguity. The challenges of grammatical approaches include computational complexity, grammar design, and parameter estimation. Other instances of the subject invention can also provide a set of general purpose geometric constraints and data structures which can be utilized to accelerate the parsing of two-dimensional inputs.

For example, a structured layout (e.g., document layout, equation, etc.) can be modeled as a grammar. A grammatical parser can then be employed to determine an optimal parse. Instances of the subject invention can be utilized to facilitate in scoring grammatical parses to facilitate in obtaining the optimal parse. Images of, for example, parse trees, parse subtrees, and/or additional features and the like can be employed by instances of the subject invention to facilitate determination of an optimal parse. Additional techniques can also be utilized to facilitate in the efficiency of instances of the subject invention such as, for example, geometric constraints for parse acceleration and/or "fast" features for document analysis. Thus, unlike many other prior approaches for two-dimensional analysis, instances of the subject invention can be utilized for a variety of complex recognition tasks while maintaining high recognition performance.

In FIG. 1, a block diagram of a two-dimensional grammatical analysis system 100 in accordance with an aspect of the subject invention is shown. The two-dimensional grammatical analysis system 100 is comprised of a two-dimensional grammatical analysis component 102 that receives an input 104 and provides an output 106. The two-dimensional grammatical analysis component 102 utilizes image recognition to facilitate in determining an optimal parse tree for the input 104. The input 104 includes, for example, a document page and/or an equation and the like. The two-dimensional grammatical analysis component 102 parses the input 104 utilizing a grammatical parsing process that is facilitated by image recognition to provide the output 106. The output 106 can be comprised of, for example, an optimal parse tree for the input 104. The image recognition assists the parsing process by facilitating a grammatical cost function for a global search. A globally learned "reference" grammar can also be established to provide parsing solutions for different tasks without requiring additional grammar learning.

Figure 2:
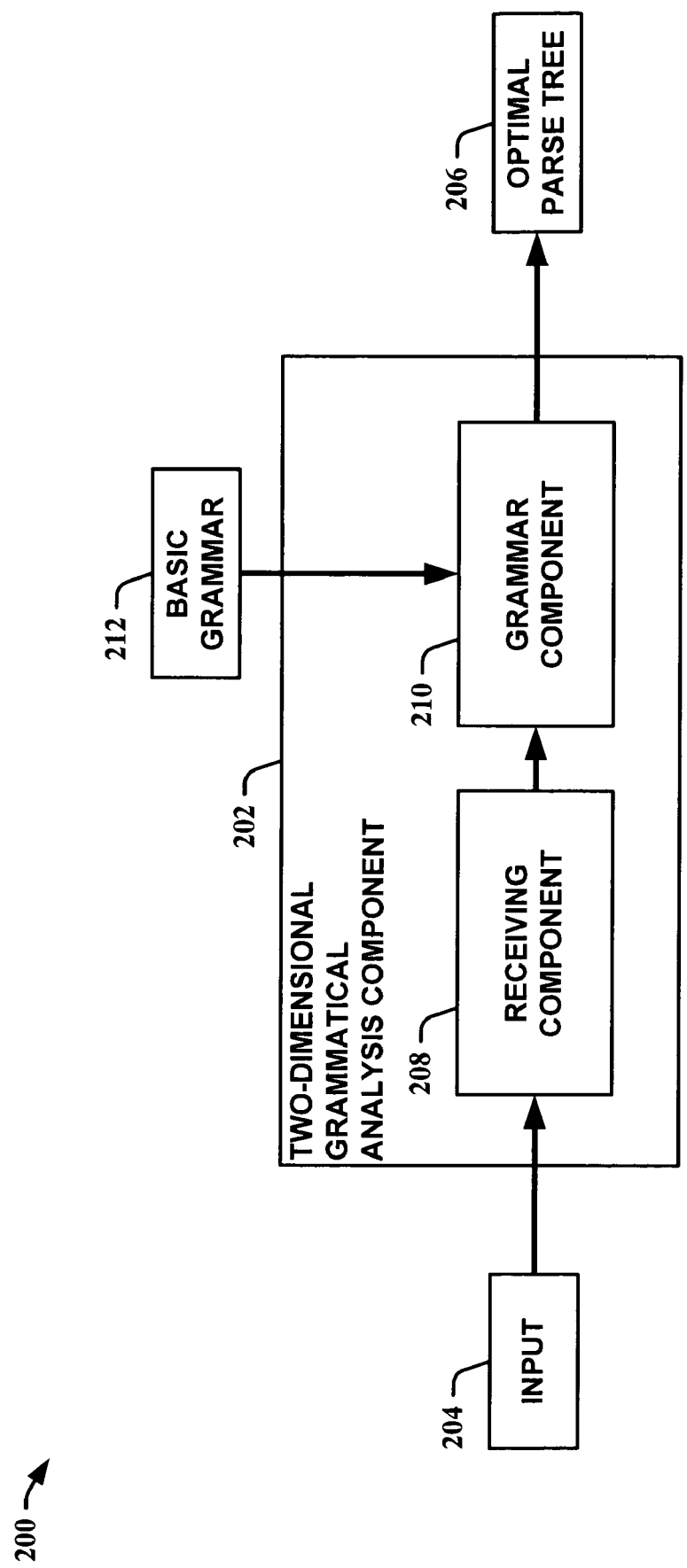
FIG. 2 is another block diagram of a two-dimensional grammatical analysis system in accordance with an aspect of the subject invention.

Looking at FIG. 2, another block diagram of a two-dimensional grammatical analysis system 200 in accordance with an aspect of the subject invention is illustrated. The two-dimensional grammatical analysis system 200 is comprised of a two-dimensional grammatical analysis component 202 that receives an input 204 and provides an optimal parse tree 206. The two-dimensional grammatical analysis component 202 utilizes a discriminative grammatical model of the input 204. The two-dimensional grammatical analysis component 202 is comprised of a receiving component 208 and a grammar component 210. The receiving component 208 receives the input 204 and relays it 204 to the grammar component 210. In other instances, the functionality of the receiving component 208 can be included in the grammar component 210, allowing the grammar component 210 to directly receive the input 204. The grammar component 210 also receives a basic grammar input 212. The basic grammar input 212 provides an initial grammar framework for the input 204. The grammar component 210 parses the input 204 to obtain an optimal parse tree 206. It 210 accomplishes this via utilization of a grammatical parsing process that employs image recognition to score parse trees and/or parse sub-trees to facilitate in determining the optimal parse tree 206.

Figure 3:
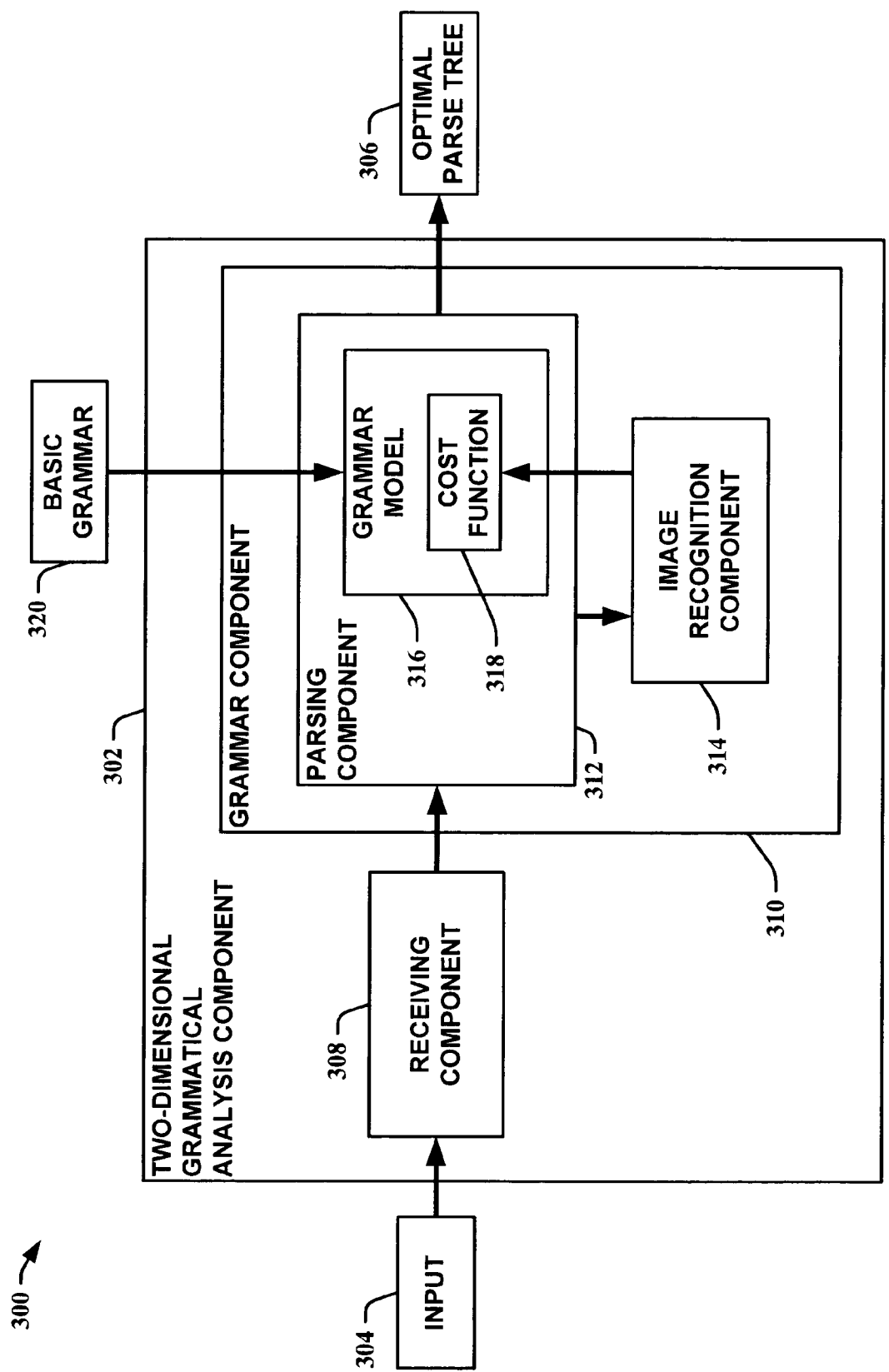
FIG. 3 is yet another block diagram of a two-dimensional grammatical analysis system in accordance with an aspect of the subject invention.

Turning to FIG. 3, yet another block diagram of a two-dimensional grammatical analysis system 300 in accordance with an aspect of the subject invention is depicted. The two-dimensional grammatical analysis system 300 is comprised of a two-dimensional grammatical analysis component 302 that receives an input 304 and provides an optimal parse tree 306. The two-dimensional grammatical analysis component 302 utilizes a discriminative grammatical model of the input 304 for parsing. The two-dimensional grammatical analysis component 302 is comprised of a receiving component 308 and a grammar component 310. The grammar component 310 is comprised of a parsing component 312 and an image recognition component 314. The parsing component 312 is comprised of a grammar model 316 with a grammatical cost function 318. The input 304 includes, for example, a document page and/or an equation and the like. The receiving component 308 receives the input 304 and relays it 304 to the parsing component 312. In other instances, the functionality of the receiving component 308 can be included in the parsing component 312, allowing the parsing component 312 to directly receive the input 304. The parsing component 312 parses the input 304 based on a basic grammar input 320 into parse trees and/or parse sub-trees. The image recognition component 314 then receives the parse trees and/or parse sub-trees from the parsing component 312 and renders them as images, performs recognition, and assesses a score for the images. The image recognition component 314 can utilize, in other instances of the subject invention, machine learning processes to build classifiers that facilitate in determining recognition of images based on key distinguishing features. The classifiers can also be utilized to assess scores of the images. The parsing component 312 then utilizes the image scores in the grammatical cost function 318 of the grammar model 316 to facilitate in determining costs of parses and/or sub-parses of the input 304. In this manner, the process continues iteratively until an optimal parse tree 306 is obtained (e.g., no higher scoring parse tree is obtained or no lower cost parse tree is obtained). The optimal parse tree 306 is based on a global search.

Grammatical Parsing

Grammatical approaches for document structure analysis have a long history. In comprehensive reviews of the field, a significant percentage of the reported papers have used grammatical approaches (see, S. Mao, A. Rosenfeld, and T. Kanungo, "Document structure analysis algorithms: A literature survey," in Proc. SPIE Electronic Imaging, vol. 5010, January 2003, pp. 197-207; R. Zanibbi, D. Blostein, and J. R. Cordy, "A survey of table recognition: Models, observations, transformations, and inferences," International Journal of Document Analysis and Recognition, vol. 7, no. 1, pp. 1-16, 2004; and K.-F. Chan and D.-Y. Yeung, "Mathematical expression recognition: a survey," International Journal on Document Analysis and Recognition, vol. 3, pp. 3-15, 2000). Grammatical document processing research relies on the related work in the field of general grammatical parsing.

For example, the work of Krishnamoorthy, et al. uses the grammatical and parsing tools available from the programming language community (see, M. Krishnamoorthy, G. Nagy, S. Seth, and M. Viswanathan, "Syntactic segmentation and labeling of digitized pages from technical journals," IEEE Transactions on Pattern Analysis and Machine Intelligence, vol. 15, pp. 737-747, 1993) (see also, (A. Conway, "Page grammars and page parsing, a syntactic approach to document layout recognition," in Proceedings of the Second International Conference on Document Analysis and Recognition, Tsukuba Science City, Japan, 1993, pp. 761-764 and D. Blostein, J. R. Cordy, and R. Zanibbi, "Applying compiler techniques to diagram recognition," in Proceedings of the Sixteenth International Conference on Pattern Recognition, vol. 3, 2002, pp. 123-136)). Similarly, the work by Hull uses attributed probabilistic context free grammars (see, J. F. Hull, "Recognition of mathematics using a two-dimensional trainable context-free grammar," Master's thesis, MIT, June 1996) (see also, (P. Chou, "Recognition of equations using a two-dimensional stochastic context-free grammar," in SPIE Conference on Visual Communications and Image Processing, Philadelphia, Pa., 1989; E. G. Miller and P. A. Viola, "Ambiguity and constraint in mathematical expression recognition," in Proceedings of the National Conference of Artificial Intelligence, American Association of Artificial Intelligence, 1998; and N. Matsakis, "Recognition of handwritten mathematical expressions," Master's thesis, Massachusetts Institute of Technology, Cambridge, Mass., May 1999)).

There has been a rapid progress in research on grammars in the natural language community. These advances have led to more powerful grammatical models that can be learned directly from data (see, B. Taskar, D. Klein, M. Collins, D. Koller, and C. Manning, "Max-margin parsing," in Empirical Methods in Natural Language Processing (EMNLP04), 2004). Such models are strictly more powerful than the probabilistic context free grammars used in previous document analysis research. Simultaneously there has been progress on accelerating the parsing process in the presence of ambiguity (see, E. Charniak, S. Goldwater, and M. Johnson, "Edge-based best-first chart parsing," in Proceedings of the Fourteenth National Conference on Artificial Intelligence, 1998, pp. 127-133 and D. Klein and C. D. Manning, "A* parsing: Fast exact viterbi parse selection," Stanford University, Tech. Rep. dbpubs/2002-16, 2001).

Image Representations for Parse Scoring

Parsers typically include a scheme to determine scores for parse trees. Instances of the subject invention provide systems and methods that utilize image recognition mechanisms to facilitate in determining a parse score. For example, parse trees and subtrees can be rendered as images as well as additional features such as, for example, stroke curvature and/or nearby white space and the like. The rendered images can then be utilized to facilitate in determining an optimal parse for a grammatical parser.

Figure 4:
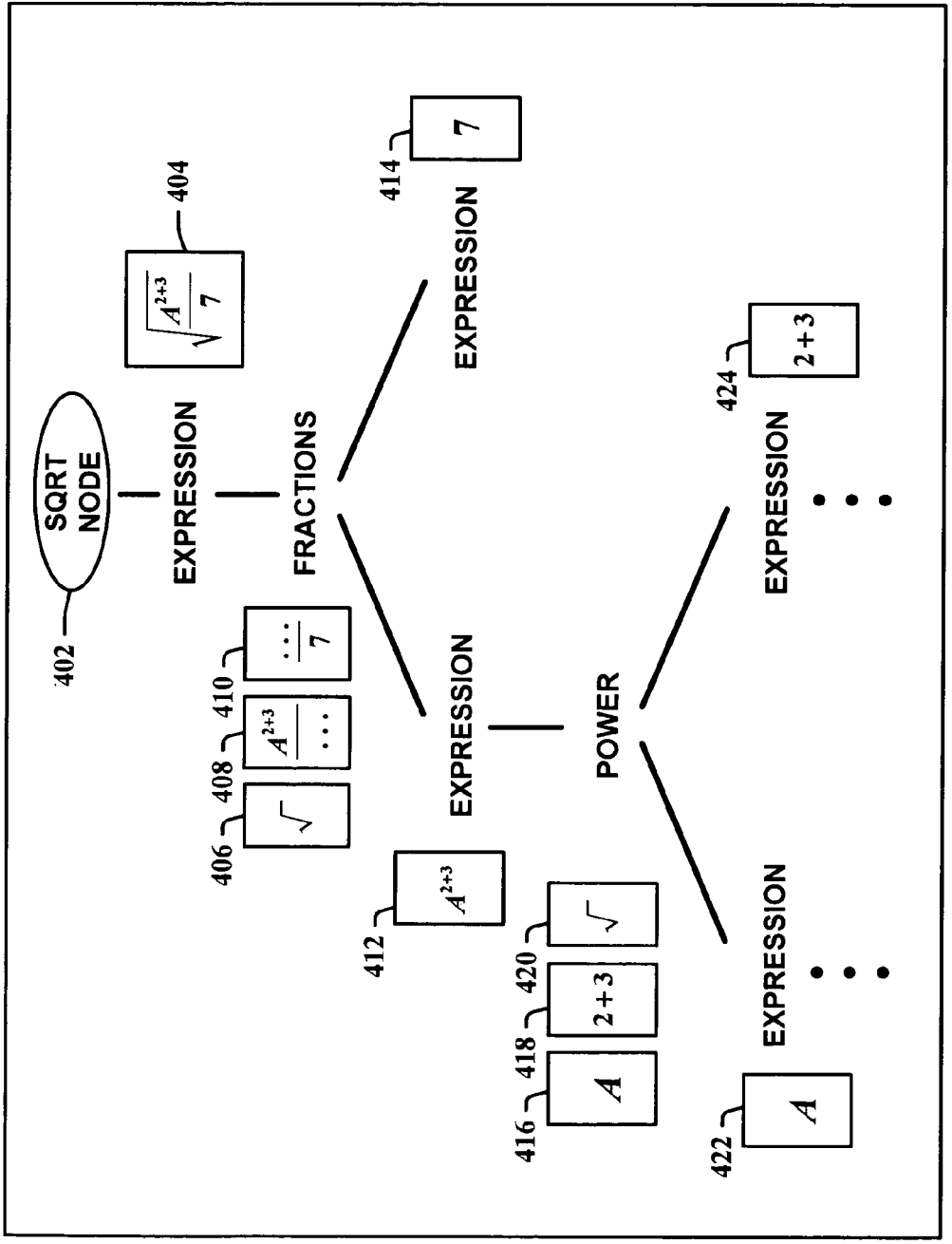
FIG. 4 is an illustration of utilizing image recognition with grammatical parsing in accordance with an aspect of the subject invention.

It is very useful to be able to simultaneously learn how to do recognition at many levels of a tree of abstraction. Not only is it important to group strokes and the like properly, it is also important to have the correct parse tree for proper contextual assessment. This is particularly beneficial in properly recognizing equations. For example, an equation such as $$\text{``}\sqrt{\frac{A^{2+3}}{7}}\text{''}$$

can be parsed utilizing grammatical parsing as shown in the parse tree illustration 400 of FIG. 4. For brevity, the complete example parse tree for this equation is not illustrated nor are all possible parse trees illustrated. In this example, a square root node 402 contains an expression $$\text{``}\sqrt{\frac{A^{2+3}}{7}}\text{''}$$

404 that can be viewed as images of fractions $$\text{``}\frac{A^{2+3}}{\ldots}\text{''}$$

408 and $$\text{``}\frac{\ldots}{7}\text{''}$$

410 (there are many other trees that can be essentially equivalent) along with contextual information 406. The fractional images $$"\frac{A^{2+3}}{...}"$$

408 and $$"\frac{...}{7}"$$

410 can be further parsed into expression images "$A^{2+3}$" 412 and "7" 414. The expression image "$A^{2+3}$" 412 can then be further parsed into a series of power images "A" 416, "2+3" 418, and "$\sqrt{}$" 420. These images can then be further parsed into an "A" expression image 422 and a "2+3" expression image 424. The parsing can continue beyond what is shown in the illustration 400. Hidden in the parse tree and sub-trees is grouping information as well. If an image is in a sub-tree, then it is automatically part of a group. In the above example, the final image could be an "A" symbol that is actually the strokes of the letter A. By utilizing instances of the subject invention, a learning classification system that can process partial explanations can be employed to utilize the resulting images to facilitate in scoring the parse based on how likely it is to be true, with or without utilizing the contextual information.

The image representation recognition processes provided by instances of the subject invention work with document parsing as well. For example, a document is given and it essentially is an "image" of that document with a title, author, abstract, columns and other information. A grammar model for a document with such a layout can be obtained to facilitate in parsing the image of the document. The grammar model is then utilized to parse, for example, columns into paragraphs, paragraphs into sentences, and sentences into words and the like. In essence, everything is embedded as an image, and an image recognition process is then employed to recognize the image. Scores are then established for the images and a cost function assesses the parse trees to determine an optimal parse tree.

Machine learning techniques can be utilized to provide a learning mechanism to improve the parsing process. Given an existing grammar, an input, such as a set of labeled examples (i.e., a set of images, a set of parsed trees for images, an assignment of nodes in the trees to items on a document page, and the like), is processed along with a basic grammar input. The examples are first parsed with the grammar and a true tree ("T-tree") and a parse tree ("P-tree") are obtained to build a "learning machine." The learning machine then processes an input such as an image that is labeled, for example, as a "fraction." A parse tree that might be false under some circumstances could be employed and might evaluate equation "$A^{2+3}$", as "$A^2+3$", which it is not. Thus, intermediate parses are obtained and then a second iteration is performed. Typically, one classifier per type is determined based on positive and/or negative examples. If positive and negative examples exist, a determination is made as to what key distinguishing properties separate positive results from negative results, and a classifier for that type is built based on that distinction. The classifier utilizes the images to determine a score and provides that score to the grammatical parser to facilitate in determining the lowest cost parse tree which is typically the optimal parse.

Geometric Constraints for Parse Acceleration

Grammars are a powerful technique for modeling and extracting the structure of documents. One large challenge, however, is computational complexity. The computational cost of grammatical parsing is related to both the complexity of the input and the ambiguity of the grammar. For programming languages, where the terminals appear in a linear sequence and the grammar is unambiguous, parsing is O(N). For natural languages, which are linear yet have an ambiguous grammar, parsing is $O(N^3)$. For documents, where the terminals are arranged in two dimensions and the grammar is ambiguous, parsing time can be exponential in the number of terminals. Several types of geometrical data structures are introduced (and unified) which can be used to significantly accelerate parsing time. Each data structure embodies a different geometrical constraint on the set of possible valid parses. These data structures are very general, in that they can be used by any type of grammatical model, and a wide variety of document understanding tasks, to limit the set of hypotheses examined and tested. Assuming a clean design for the parsing software, the same parsing framework can be tested with various geometric constraints to determine the most effective combination.

Miller and Viola describe a system for parsing equations which uses geometrical data structures to control the complexity of the parsing process (see, Miller and Viola). Instances of the subject invention improve on their algorithms and present a number of new geometric algorithms as well. Other researchers have used geometric graph data structures to constrain the set of interpretations on the page (see, Matsakis). While these papers do not discuss grammars directly, the segmentation and recognition problem that they solve can be rephrased as a parsing problem with a simplified grammar. Instances of the subject invention improve on these graph structures as well.

Figure 5:
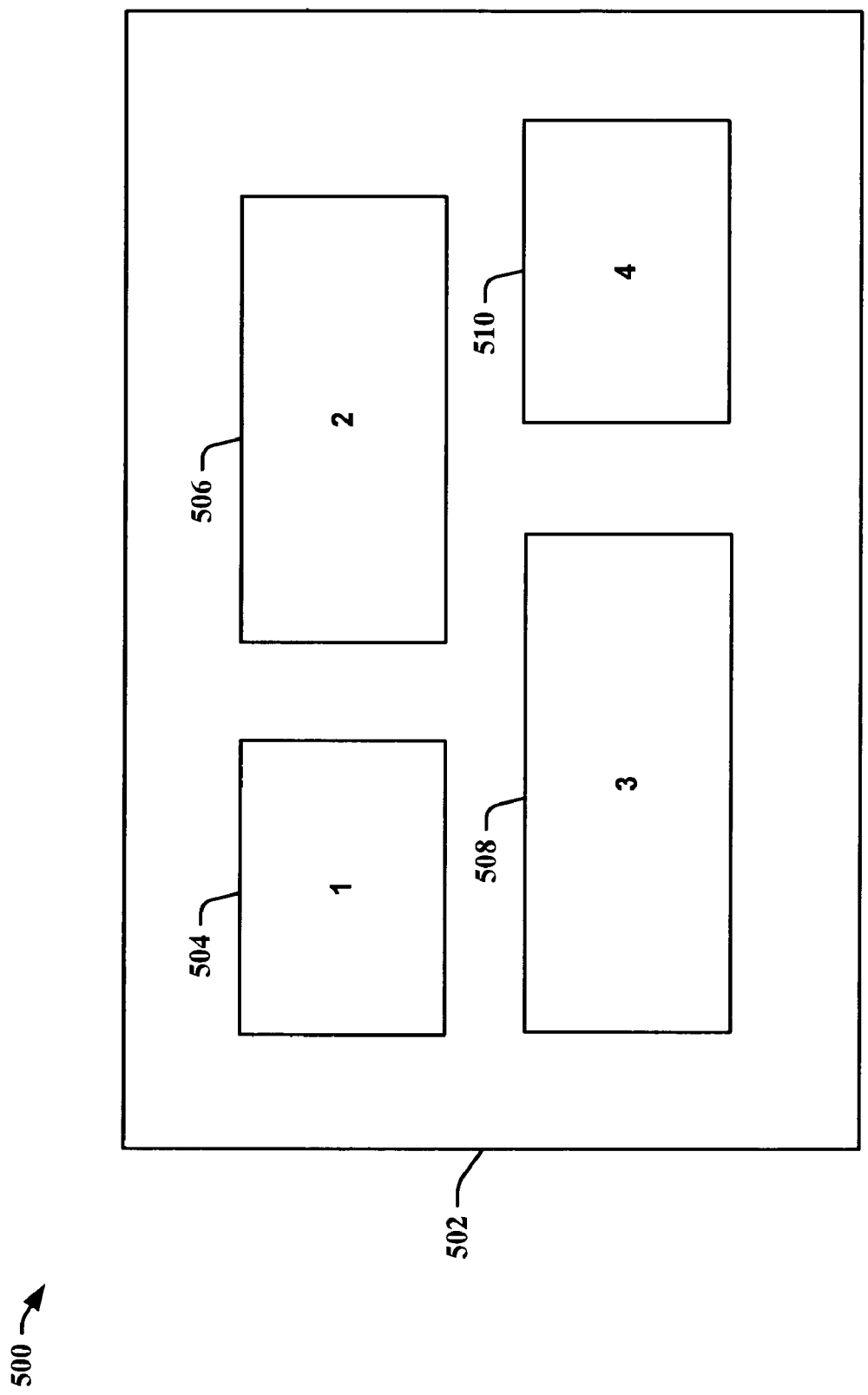
FIG. 5 is an illustration of an example structured layout in accordance with an aspect of the subject invention.

One simple example examined in detail is provided to facilitate implementation of the algorithms presented below. FIG. 5 shows a page 502 with four terminal objects 504-510, which depending on the application, could be connected components, pen strokes, text lines, etc. In this case, the objects are assumed to be words on a simple page, and the task is to group the words into lines and lines into paragraphs. A simple grammar that expresses this process is illustrated in TABLE 1.

TABLE 1

Simple Grammar Expression for Process

| | |
|---|---|
| (Page → ParList) | (LineList → Line LineList) |
| (ParList → Par ParList) | (LineList → Line) |
| (ParList → Par) | (Line → WordList) |
| (Par → LineList) | (WordList → Word WordList) |
| | (WordList → Word) |

The correct parse in this case is:

TABLE 2

Correct Parse for Case (Page (ParList
  (Par (LineList
    (Line (WordList (Word 1) (WordList (Word 2))))
    (LineList (Line (WordList (Word 3)
      (WordList (Word 4)))))))))

This parse tree provides a great deal of information about the structure: there is one paragraph containing two lines; the first line contains word 1 and word 2, etc. The grammatical approach can be adopted for many types of document analysis tasks, including the parsing of mathematical expressions, text information extraction, and table extraction.

In general, productions in a grammar have the form (A→B C) which states that the non-terminal symbol A can be replaced by the non-terminal B followed by the non-terminal C. Following the general conventions for grammars, non-terminals are written in upper case and terminals in lower case. For brevity, the description is restricted to a binarized grammar in which each non-terminal has either one or two elements on the right hand side (any more general grammar can be converted to a binary grammar easily). A simple weighted grammar, or equivalently a Probabilistic Context Free Grammar (PCFG), additionally assigns a cost to every production. Productions which are applicable expand the non-terminals with a log probability proportional to cost.

Most practitioners of computer science are familiar with the notion of a programming language grammar. These grammars are specially designed to be both globally and locally unambiguous. For such grammars very efficient linear time parsing algorithms can be used. In the case of English language grammars, where there are unavoidable ambiguities, there are often hundreds or thousands of valid parses for any sentence (see, E. Charniak, "Statistical techniques for natural language parsing," AI Magazine, 1997). For a linear sequence of terminals parsing requires $O(PN^3)$ time, where P is the number of productions in the grammar and N are the number of terminals.

While there are a number of competing parsing algorithms, one simple yet generic framework is called Chart Parsing (see, M. Kay, "Chart generation," in Proceedings of the 34th conference on Association for Computational Linguistics. Association for Computational Linguistics, 1996, pp. 200-204). Chart uses dynamic programming to avoid the re-computation of subproblems. Chart parsing attempts to fill in the entries of a chart C(A,R) which is the best score of a non-terminal A as an interpretation of the sub-sequence of terminals R. The cost of any non-terminal can be expressed as the following recurrence shown in Equation 1:

$$C(A, R) = \min_{\substack{A \to BC \\ R_1 \cap R_2 = \phi \\ R_1 \cup R_2 = R}} C(B, R_1) + C(C, R_2) + l(A \to BC), \quad \text{Eq. (1)}$$

where {BC} ranges over all productions for A, and R is a subsequence of terminals (denoted as a "region"), and $R_1$ and $R_2$ are subsequences which are disjoint and whose union is R (i.e., they form a partition). Essentially the recurrence states that the score for A is computed by finding a low cost decomposition of the terminals into two disjoint sets. Each production is assigned a cost (or loss or negative log probability) in the table l(A→BC). The entries in the chart (sometimes called edges) can be filled in any order, either top down or bottom up. The complexity of the parsing process arises from the number of chart entries that must be filled and the work required to fill each entry. When analyzing a linear sequence of terminals there are $O(PN^2)$ entries (since there are $$\frac{1}{2}\binom{N}{2} \in O(N^2)$$

pairs <i,j>. Since the work required to fill each entry is O(N), the overall complexity is $O(PN^3)$.

Geometric Parsing is Exponential

Instances of the subject invention utilize algorithms for parsing terminals arranged on a two-dimensional page. Unfortunately, a direct application of chart parsing to two-dimensional arrangements of terminals requires exponential time. The key problem is that the terminals no longer have a linear sequential order. Returning to Eq. (1), the region R is now a subset, and $R_1$ and $R_2$ are subsets which are disjoint and whose union is R (i.e., they form a partition). As before, the size of the chart can be analyzed, which is O(P|P(N)|) where P(N) is set of all subsets of N terminals. In general, there are an exponential number of subsets, and hence the algorithm is exponential. Others have observed this dilemma and have either assumed that the 2D terminals are linearly ordered (by some earlier process) or have worked with other linearizations (for example, Krishnamoorthy, et al. parses linear projections of the input).

Miller and Viola introduced an effective heuristic which significantly improved performance. They select subsets $R_1$, $R_2$ such that either chull($R_1$)∩$R_2$=∅ or chull($R_2$)∩$R_1$=∅. Calling these sets regions is now appropriate, since each set lies within a convex region of the page. It is worth noting that if the terminals lie along a line (and therefore have a strict linear ordering) the convex hull criterion yields the $O(N^2)$ regions and is equivalent to the contiguous subsequence constraint used in conventional parsing. While this constraint is effective in practice, the worst case complexity is still exponential and the computation of the convex hulls themselves is somewhat expensive. The notion of region (and sub-region) is quite general. A region of the input is a set of the terminals, coupled with a constraint on the set of subsets which are valid for parsing. For the case of classical parsing the regions are sequential terminals and are represented by a pair of integers <i,j>. The sub-regions are sequential subsets of terminals <i,k> and <k,j>. Several new kinds of geometric regions are proposed. Each region is defined and motivated, and an efficient algorithm for enumerating valid subsets is also presented. Each can lead to a significant speed up of parsing.

Rectangle Hull Region

The first region is denoted as a Rectangle Hull Region. Sub-regions are constrained so that rhull($R_1$)∩rhull($R_2$)=∅, where rhull(X) is smallest axis aligned rectangle which contains X (known as a rectangle hull). The motivation for this region comes from the convex hulls used by Miller and Viola, but it is much easier to compute. For printed pages which have been deskewed, the constraint implied by the Rectangle Hull Region is essentially equivalent to the convex hull constraint.

The number of valid rectangle regions is polynomial (as in a conventional sequence region). To see this, notice that the left boundary of rhull(X) is defined by the leftmost point in the subset of terminals X. This point must be the leftmost point of some terminal in X. The same argument applies to the top, bottom, and right boundaries. Every potential rectangle hull region <t,b,l,r> can be enumerated by selecting 4 terminals. The left boundary of the first terminal defines the left boundary of the region, l; the top of the second defines the top, t; the bottom of the third defines the bottom, b; the right boundary of the final terminal defines the right, r. There are no more than $$\binom{N}{4} = O(N^4)$$

valid sub-regions. Note that in practice there are many fewer regions, since many of the regions may fail the disjoint test above (since a terminal may be split by the boundary and will neither lie inside of rhull($R_1$) nor entirely outside). In experiments it is often the case that approximately $O(N^2)$ rectangular sub-regions are admissible.

For top down parsing the following efficient algorithm is used to enumerate all valid pairs of rectangle hull sub-regions (these pairs are used to drive the recursion in Eq. (1)). Insert the top, $t_i$, and bottom, $b_i$, of each terminal, i, into a single sorted list. Given a region <t,b,l,r>, it can be split into two valid sub-regions as <t,s,l,r> and <s,b,l,r>, if t<s<b and the boundary does not intersect any terminal in the current region. All admissible s can be found in a single pass over the sorted list from top to bottom. As the list is traversed, instances of the subject invention keep track both of the current element, s' and the set of all terminals which are split: $t_i$<s'<$b_i$ (the top of terminal i is above the separator and the bottom is below the separator). The value s' is a valid separator if the list of split terminals is empty. Note that the list of split terminals can be updated rapidly. If the previous element is a top, $t_i$, add i to the list. If the previous element is a bottom, $b_i$, remove i from the list. Vertical splits are computed by repeating the entire process for the left and right bounds of the terminals. Note that the work of sorting can be done once for the entire page. Thereafter, sublists of the full sorted list are used. Also note that there can be at most 4N pairs of admissible subsets, though many of these are often pruned away since they are inadmissible.

Convex Hull Region

The convex hull criterion of Miller and Viola is a clear candidate for use as a type of region. The key challenge is to enumerate all admissible subsets efficiently. Recall that subsets $R_1$ and $R_2$ must satisfy the criteria that $R_1 \cap \text{chull}(R_2) = \emptyset$ or $R_2 \cap \text{chull}(R_1) = \emptyset$. A closely related criterion is equally valuable, but has the advantage that it is very efficiently enumerable. This new criteria requires that $\text{chull}(R_1) \cap \text{chull}(R_2) = \emptyset$. Note that this new criteria always implies the first.

Figure 6:
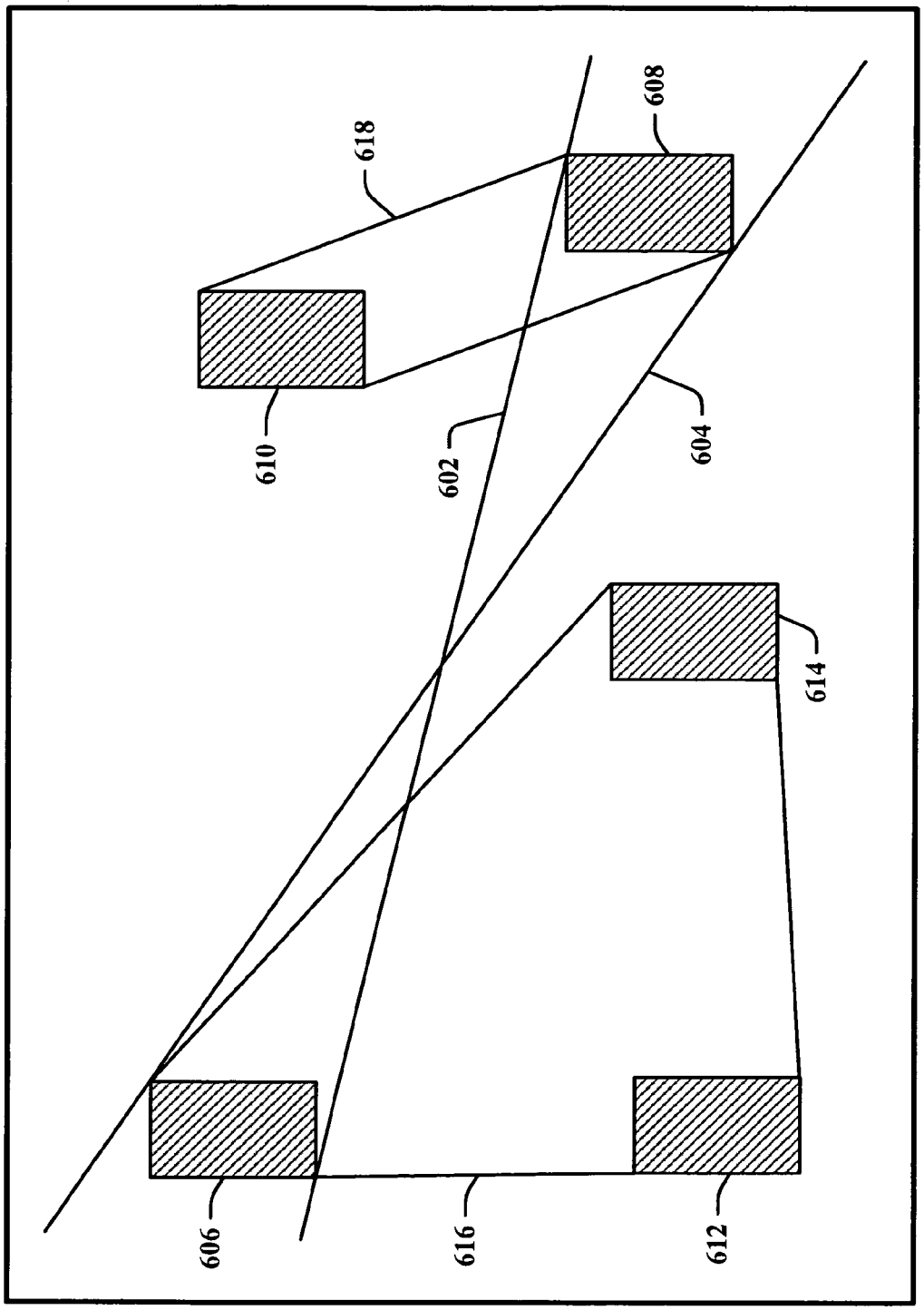
FIG. 6 is an illustration of the co-tangent lines for a pair of terminals in accordance with an aspect of the subject invention.

Recall that valid rectangle hull sub-regions are enumerated by finding separating lines which are defined by the boundaries of the terminals. Convex hull sub-regions can be generated similarly. First note that every pair of admissible subsets $\text{chull}(R_1) \cap \text{chull}(R_2) = \emptyset$ is separated by a line which is tangent to both $\text{chull}(R_1)$ and $\text{chull}(R_2)$. FIG. 6 is an illustration 600 of the co-tangent lines 602, 604 for a pair of terminals 606, 608. The shaded rectangles 606-614 represent the bounding boxes of the terminals while the polygons 616, 618 are a pair of implicitly defined convex hulls. The proof is omitted for brevity. Recall that the goal is to enumerate subsets that satisfy the convex hull criteria efficiently, not to compute convex hulls. Instances of the subject invention accomplish this by enumerating all potential co-tangent lines. Since every co-tangent line passes through a pair of terminals, all potential co-tangent lines can be enumerated in $$O\left(\binom{N}{2}\right).$$

Miller and Viola do not discuss the algorithm used to enumerate convex hull admissible subsets. It is possible that their algorithm, while very fast for the smaller problems they encountered, may well have been exponential. Thus, this is the first description of an algorithm for enumerating convex hull compatible sub-regions efficiently.

Graph Region

In his work on the parsing of mathematical expressions, Matsakis proposes the use of a Minimum Spanning Tree (MST) on the set of terminals (see, Matsakis). Given some distance measure between pairs of terminals on the page (perhaps centroid distance or nearest point distance) one can compute the MST in $O(N^2 \log N^2)$. Valid regions are subsets of the terminals which are connected in this graph. This criterion is based on the observation that when two terminals are near neighbors on the page they are often near neighbors in the parse tree. Conversely, if a pair of subsets is far apart they are rarely combined into a single subtree. However, the MST criterion is worse case exponential, though it is quite effective in practice.

Figure 7:
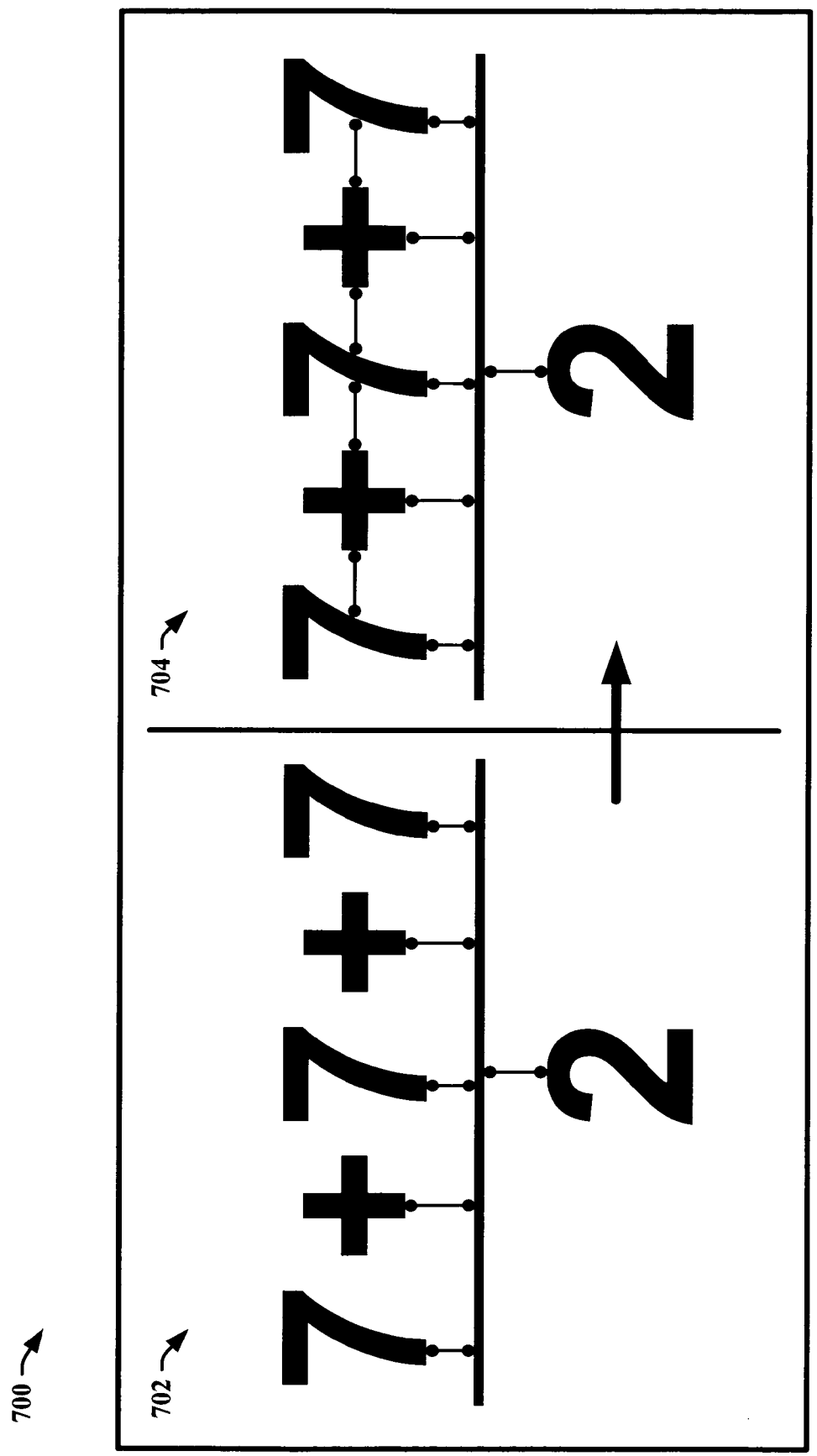
FIG. 7 is an illustration of an arrangement of symbols for which an MST does not yield the correct subgroups and an arrangement with additional edges added to the MST which allows the correct grouping in accordance with an aspect of the subject invention.

Perhaps a more serious flaw is the fragility of the MST. One type of problem arises from expressions containing fractions, since the fraction bar sometimes lies closer to the symbols in the numerator than other symbols in the numerator. In FIG. 7, an illustration 700 of an arrangement 702 of symbols for which the MST does not yield the correct subgroups is shown. Note this type of arrangement 702 also admits an exponential (though manageable) number of parses. The illustration 700 also depicts an arrangement 704 with additional edges added to the MST which allows the correct grouping. Additionally, for handwritten inputs, there are many examples where the MST contradicts the parse tree. The fragility of the MST can be addressed by adding additional edges to the graph. A simple proposal is to connect the k nearest neighbors on the page. This increases the number of subsets significantly, but tends to fix many of the problems with the MST.

One can directly enumerate all connected subsets of a graph using a variant of breadth first search, being careful to use a hash table to exclude subsets which are encountered twice. The search proceeds using a queue of connected subsets. A subset of size n is removed from the queue and is extended by finding all nodes which are directly connected to some element of the subset. If there are k such connected nodes, a collection of k connected subsets of size n+1 are created and placed back in the queue. Before insertion, a hash table is consulted to determine if the subset is a duplicate, and if so is discarded.

For graphs where there are an exponential number of connected subgraphs, all enumeration algorithms are intractable. In practice, the constraint that a sub-region be connected is used to prune regions generated by one of the other region types. In this case, the complexity is that of the enumerating region (though the final number of regions is often significantly reduced).

Partial Order Region

In his work on determining reading order, Breuel defines a partial order on the lines of the pages (see, T. Breuel, "High performance document layout analysis," in 2003 Symposium on Document Image Understanding Technology, Greenbelt Md., 2003). Each pair of lines, a and b, is examined to determine if there is an ordering between them: (Condition 1), line a comes before line b if their ranges of horizontal coordinates overlap and if a is above b on the page; (Condition 2), line a comes before b if a is entirely to the left of b and if there does not exist a line c whose vertical coordinates are between a and b and whose range of horizontal coordinates overlaps both a and b. Surprisingly these two simple rules yield sufficient constraint so that the topological sort of the lines frequently matches the page reading order.

While Breuel's technique is quite beautiful due to its simplicity, there are two types of common failures: ambiguity and incorrectness. Ambiguity arises whenever the topological sort is not unique. In this case one of the valid orderings is correct but many others are not. Incorrectness results when the true ordering is inconsistent with the partial order. The second rule is the primary cause of incorrectness, since it sometimes fails in situations where there are two different two column zones on the page. In addition, these heuristics often fail for the headers and footers of pages. It is tempting to modify the second condition: (Condition 2') line a comes before b if a overlaps b vertically and a is to the left of b. This new condition is consistent with almost all pages of text, but it often yields a partial order which is ambiguous. Note that condition 2' yields a strictly weaker partial order, since if condition 2' is satisfied this necessarily implies condition 2.

Breuel's partial order suggests a new type of region, which is denoted as the "Partial Order Region." In this case, regions are selected so that no element in $R_2$ comes before an element in $R_1$ which is denoted $R_1 \leq R_2$. An efficient algorithm for enumerating such regions is based on a search of the directed graph implied by the partial order. The test for an admissible sub-region is simply to check that all children of nodes in $R_2$ lie in $R_2$, or equivalently all parents of nodes in $R_1$ lie in $R_1$. Begin by performing a topological sort on the nodes to form a total order. Nodes are then each assigned either to $R_1$ or $R_2$ using depth first search. Before a node is assigned a label it is checked for admissibility as illustrated in TABLE 3 below.

TABLE 3

Admissibility Check

```
Recurse(Node[ ] n, int i)
{
    if (n.Length = = i)
            AddSubsets( );
    else {
                if (NoParentR2(n[i]) {
                    n[i].SetR1( );
                    Recurse(n, i+1);
                }
                if (NoChildR1(n[i]) {
                    n[i].SetR2( );
                    Recurse(n, i+1);
                }
            n[i].Unset( );
        }
}
```

If there are no links in the partial order graph, the above algorithm is exponential. This is the worse case. Breuel's graphs are quite dense and he reports that these partial orders often yield a unique topological ordering. In this case, the algorithm is quite efficient and is computationally equivalent to parsing a linear sequence.

Simple Example

The simple example in FIG. 5 can be used to demonstrate the various geometric regions. Given that there are four terminals 504-510, there are 16 proper subsets. A region is considered compatible with the correct interpretation if it admits all the subgroups in that parse tree. In this case, the correct regions are [1], [2], [3], [4], [1, 2], [3, 4].

TABLE 4 below shows the admissible subsets for each type of region. The sequence region is assumed to have perfect knowledge of the correct order. The other regions observe only the geometry of the terminals. The partial order region is given the following directed edges: 1>2, 1>3, 2>4, 3>4. The graph region is given the following neighborhood edges: 1-2, 1-3, 2-3, 2-4, 3-4. Since all regions enumerate the subsets of size one, the first differences appear among the 10 larger subsets. Both the "hull" based regions perform perfectly. They only admit subsets which are compatible to the correct answer. All other subsets are rejected. The Graph Region performs worst, since in a tight collection of four symbols almost every subset is connected. The Partial Order Region is a bit better, but it suffers from the tight placement of the terminals as well. Both the "graph" related regions perform much better when the terminals are strung out in a more linear arrangement. Note that the sequence region, which has access to the terminal ordering of this page, performs worse than either hull region. In this case, the geometric region constraint has additional value beyond the ordering of the nodes.

TABLE 4

Valid Regions Enumerated by the Various Types of Geometric Regions

| | Seq | Graph | Partial Order | Rect Hull | Convex Hull |
|---|---|---|---|---|---|
| 1 | X | X | X | X | X |
| 2 | X | X | X | X | X |
| 3 | X | X | X | X | X |
| 4 | X | X | X | X | X |
| 12 | X | X | X | X | X |
| 13 | | X | X | | |
| 14 | | | | | |
| 23 | X | X | X | | |
| 24 | | X | X | | |
| 34 | X | X | X | X | X |
| 123 | X | X | X | | |
| 124 | | X | | | |
| 134 | | X | | | |
| 234 | X | X | X | | |
| Totals: | | | | | |
| | 14 | 9 | 13 | 11 | 6 | 6 |

It is the tight placement of the terminals which leads to the success of the "hull" regions. There are applications, like the parsing of mathematics, where the symbols are placed very tightly, and the hull regions are not compatible with the correct parse (i.e., they reject valid subsets). One simple solution is to erode the terminals slightly, which essentially reduces the tightness of the placement. In the limit, one can erode the terminal to a single point, for example the centroid. In this case, the hulls are maximally compatible but still provide significant constraint.

Example Analysis

Some pages from the UWIII document image database have been analyzed. The UWIII database gives ground truth for words, lines, and zones, as well as the reading order. In other instances of the subject invention, a grammatical approach for the extraction of this and additional information such as sections and columns is utilized. The number of sub-regions produced for several pages from the database is reported here. The goal is to show that the geometric regions produce a reasonable number of sub-regions. One valid point of comparison is to compare the number of regions produced by a sequence region given the ground truth linear ordering of the page. The other regions operate with only geometric information. The power set is the worst case exponential number of subsets. TABLE 5 illustrates the number of regions generated. The first row is the number of lines in the file (the two rightmost files are two column files, the two leftmost are one column files).

TABLE 5

Number of Regions Generated

|  | A04GBIN | A04FBIN | A004BIN | A009BIN |
|---|---|---|---|---|
| Terminals: | 30 | 49 | 44 | 47 |
| Sequence: | 465 | 1225 | 990 | 1128 |
| Rect: | 316 | 648 | 948 | 1040 |
| Partial Order | 1599 | 2143 | 990 | 1128 |
| PowerSet | 1.0E + 009 | 5.6E + 014 | 1.8E + 013 | 1.4E + 014 |

Thus, grammatical parsing has proven valuable in a number of document analysis problems. Instances of the subject invention provide geometric algorithms which can be used to accelerate parsing for a wide variety of two dimensional parsing problems. Examples include document structure extraction, parsing of mathematical expressions (both printed and handwritten), and document information extraction and the like.

Fast Features for Document Analysis

The images that arise, for example, in document analysis are quite large. For example, at 300 dots per inch (DPI), the image can be 2400×3300 pixels. Thus, performance can be greatly enhanced by developing a set of image features which are very efficient to evaluate. The integral image features introduced by Viola and Jones (see, P. Viola and M. Jones, Robust Real-Time Face Detection, ICCV 2001: 747) for face detection are potentially very efficient, but are not well suited to this problem. First, they are not sensitive to key measurements in the image (such as the size of the characters or the alignment of the characters). Second, they cannot focus attention on just a few of the characters in the image.

In contrast, instances of the subject invention can utilize a computed constellation of integral images. Thus, rather than a single integral image for an entire page of a document, an integral image is computed for each element of the page (e.g., character, word, and/or line as appropriate, etc.). Moreover, attention can be focused by including only the critical characters in a feature computation. Instances of the subject invention can also utilize computed integral images of document features. For example, document features such as large white space rectangles, vertical alignments of bounding boxes, and/or horizontal alignments of text lines and the like can be utilized.

Basically, for example, some features on images are computed. The number of black pixels in a given rectangle is then determined to detect certain objects. In SPATIAL RECOGNITION AND GROUPING OF TEXT AND GRAPHICS (U.S. patent application Ser. No. 10/927,452, filed Aug. 28, 2004), a technique for doing that is disclosed. However, that technique can be limiting in that the processing speed may not be sufficient for real-time processing of these images. For example, for the whole image of a 'regular' image, the value of a pixel is stored at that particular pixel, but in an integral image, all values up and to the left of that particular pixel are stored. So, once the integral image is obtained, computing rectangle features is very fast. However, computing the integral image is very slow. Thus, doing the computation once and then determining rectangle features (i.e., per Viola and Jones) is acceptable. This type of solution is sufficient, for example, if, for every frame of a video, an integral image is computed and then fast rectangles on the integral image are computed. The problem with document analysis is that it is desirable to compute many integral images to compute images of pieces of the page, not just the whole page. Thus, constantly creating integral images would be very slow. Instances of the subject invention, for example, utilize a constellation of integral images to avoid re-computing integral images for every piece of a page.

Figure 8:
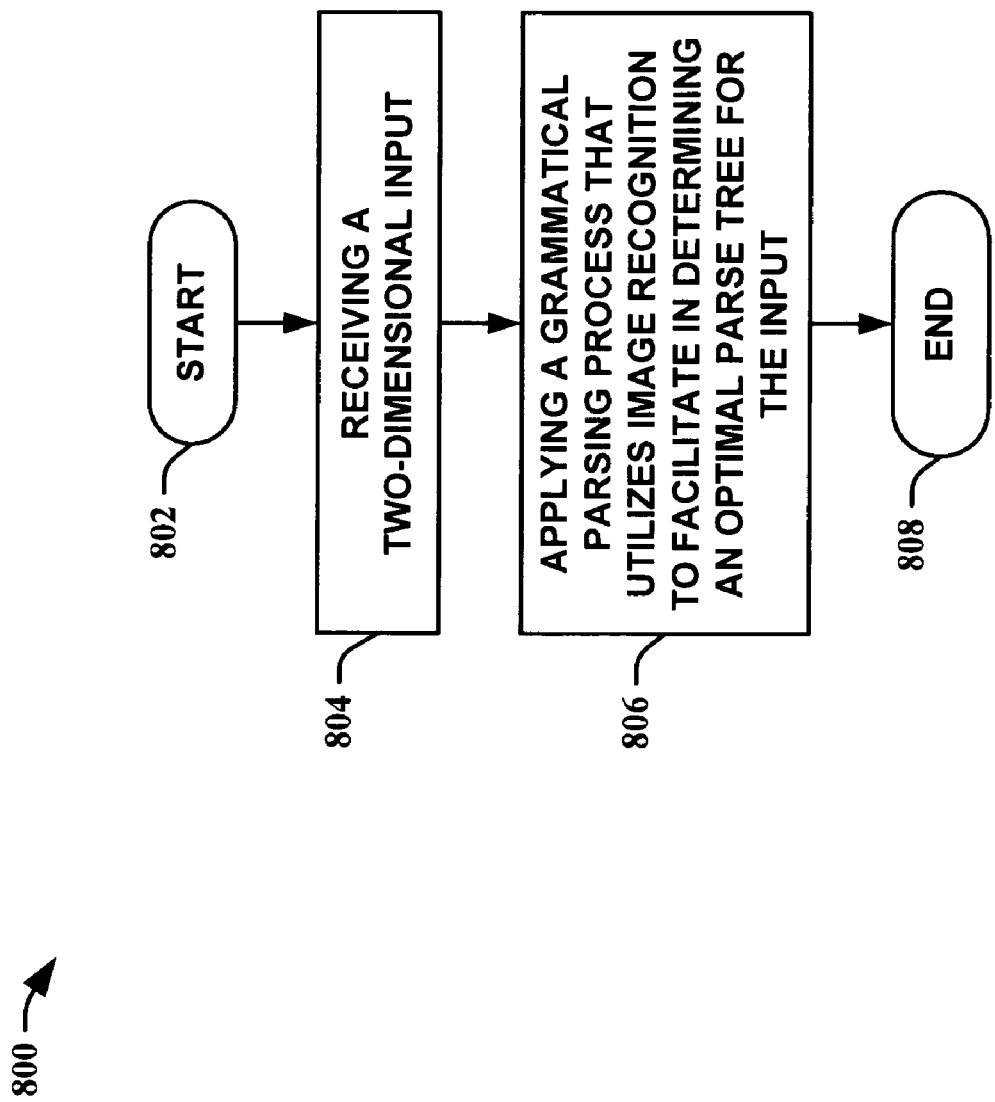
FIG. 8 is a flow diagram of a method of facilitating two-dimensional grammatical parsing in accordance with an aspect of the subject invention.
Figure 9:
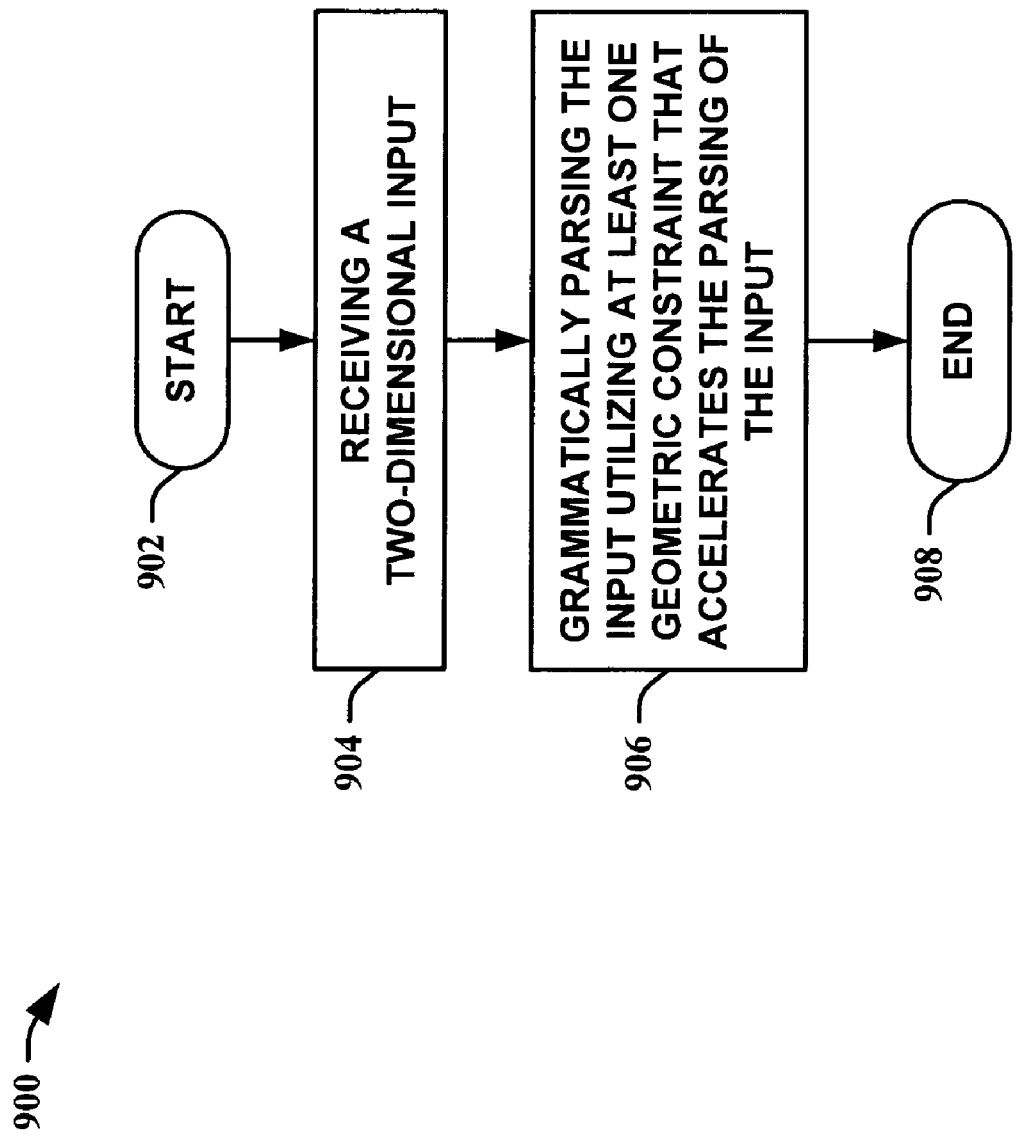
FIG. 9 is another flow diagram of a method of facilitating two-dimensional grammatical parsing in accordance with an aspect of the subject invention.
Figure 10:
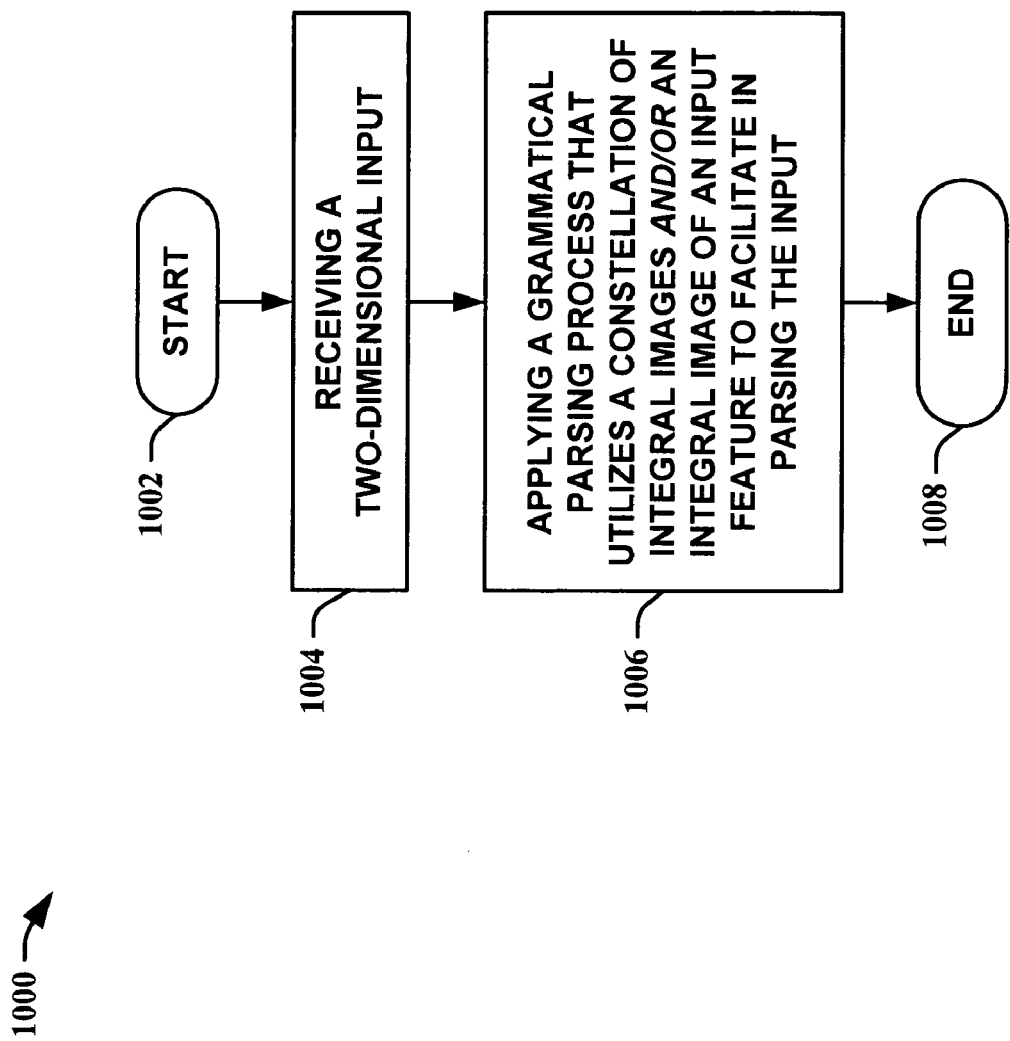
FIG. 10 is yet another flow diagram of a method of facilitating two-dimensional grammatical parsing in accordance with an aspect of the subject invention.

In view of the exemplary systems shown and described above, methodologies that may be implemented in accordance with the subject invention will be better appreciated with reference to the flow charts of FIGS. 8-10. While, for purposes of simplicity of explanation, the methodologies are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodologies in accordance with the subject invention.

The invention may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the subject invention.

In FIG. 8, a flow diagram of a method 800 of facilitating two-dimensional grammatical parsing in accordance with an aspect of the subject invention is shown. The method 800 starts 802 by receiving a two-dimensional input 804. The input can include, but is not limited to, handwritten and/or printed documents and/or equations and the like. A grammatical parsing process that utilizes image recognition is then applied to the input to facilitate in determining an optimal parse tree for the input 806, ending the flow 808. The grammatical parsing process can include, but is not limited to, processes employing image recognition to facilitate in determining scores for parse trees and/or sub-parse trees and the like. The process can also utilize classifiers to facilitate in recognition and/or scoring of images.

In FIG. 9, another flow diagram of a method 900 of facilitating two-dimensional grammatical parsing in accordance with an aspect of the subject invention is depicted. The method 900 starts 902 by receiving a two-dimensional input 904. The input can include, but is not limited to, handwritten and/or printed documents and/or equations and the like. The input is then grammatically parsed utilizing at least one geometric constraint that accelerates the parsing of the input 906, ending the flow 908. For example, the geometric constraints can include regional constraints based on a rectangle Hull region, a convex Hull region, a graph region, and/or a partial order region and the like as detailed supra. Instances of the subject invention can employ the geometric constraints to enable grammatical parsing of two-dimensional inputs in polynomial time.

In FIG. 10, yet another flow diagram of a method 1000 of facilitating two-dimensional grammatical parsing in accordance with an aspect of the subject invention is shown. The method 1000 starts 1002 by receiving a two-dimensional input 1004. The input can include, but is not limited to, handwritten and/or printed documents and/or equations and the like. A grammatical parsing process that utilizes a constellation of integral images and/or an integral image of an input feature is then applied to facilitate in parsing the input 1006, ending the flow 1008. Thus, rather than a single integral image for the entire input, an integral image can be computed for each element of the input (e.g., for a document page—character, word, and/or line as appropriate, etc.). Moreover, attention can be focused by including only the critical characters in a feature computation. For example, input features such as, for example, large white space rectangles, vertical alignments of bounding boxes, and/or horizontal alignments of text lines and the like can be utilized.

Figure 11:
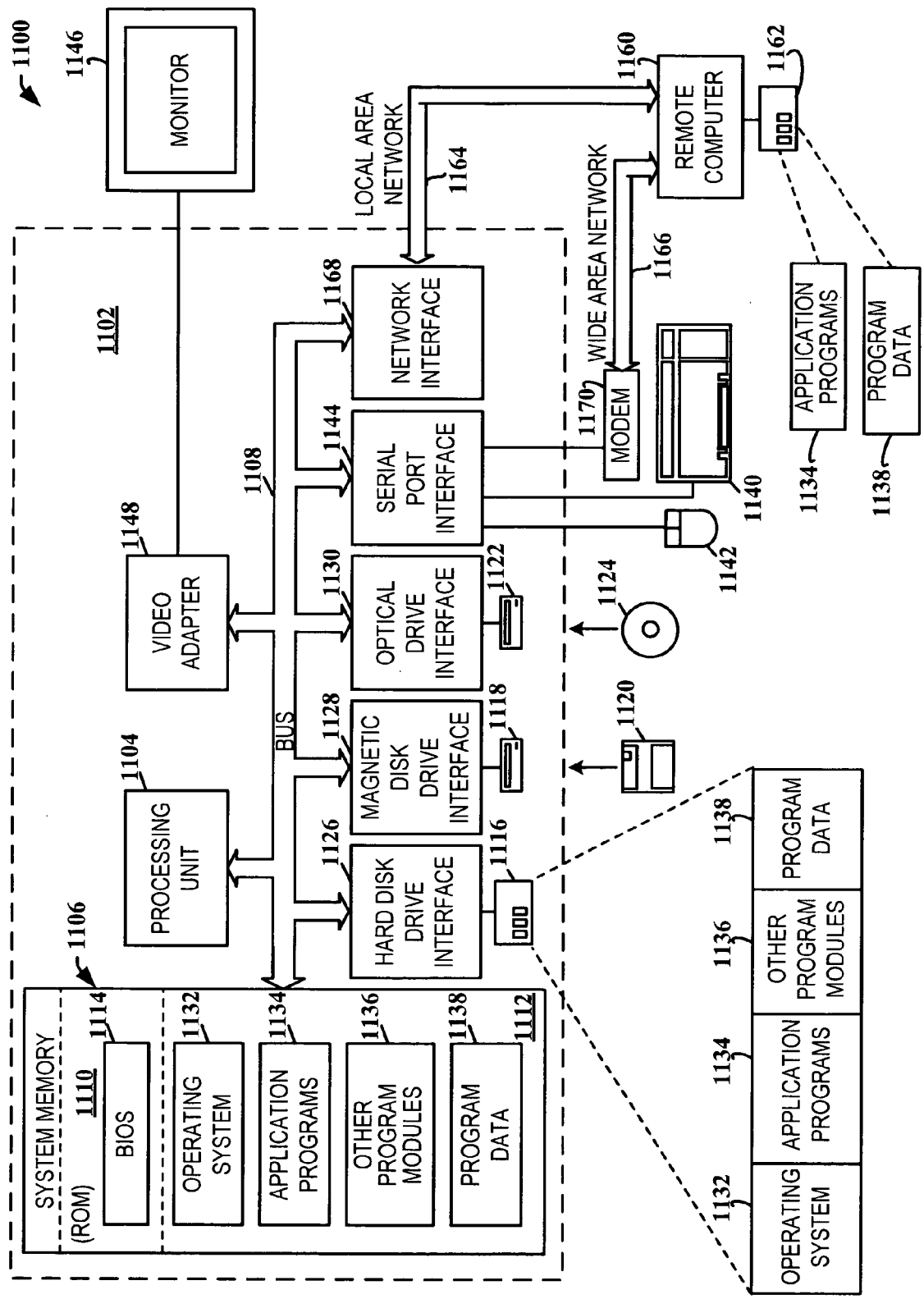
FIG. 11 illustrates an example operating environment in which the subject invention can function.

In order to provide additional context for implementing various aspects of the subject invention, FIG. 11 and the following discussion is intended to provide a brief, general description of a suitable computing environment 1100 in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 11, an exemplary system environment 1100 for implementing the various aspects of the invention includes a conventional computer 1102, including a processing unit 1104, a system memory 1106, and a system bus 1108 that couples various system components, including the system memory, to the processing unit 1104. The processing unit 1104 may be any commercially available or proprietary processor. In addition, the processing unit may be implemented as multi-processor formed of more than one processor, such as may be connected in parallel.

The system bus 1108 may be any of several types of bus structure including a memory bus or memory controller, a peripheral bus, and a local bus using any of a variety of conventional bus architectures such as PCI, VESA, Microchannel, ISA, and EISA, to name a few. The system memory 1106 includes read only memory (ROM) 1110 and random access memory (RAM) 1112. A basic input/output system (BIOS) 1114, containing the basic routines that help to transfer information between elements within the computer 1102, such as during start-up, is stored in ROM 111

The computer 1102 also may include, for example, a hard disk drive 1116, a magnetic disk drive 1118, e.g., to read from or write to a removable disk 1120, and an optical disk drive 1122, e.g., for reading from or writing to a CD-ROM disk 1124 or other optical media. The hard disk drive 1116, magnetic disk drive 1118, and optical disk drive 1122 are connected to the system bus 1108 by a hard disk drive interface 1126, a magnetic disk drive interface 1128, and an optical drive interface 1130, respectively. The drives 1116-1122 and their associated computer-readable media provide nonvolatile storage of data, data structures, computer-executable instructions, etc. for the computer 1102. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1100, and further that any such media may contain computer-executable instructions for performing the methods of the subject invention.

A number of program modules may be stored in the drives 1116-1122 and RAM 1112, including an operating system 1132, one or more application programs 1134, other program modules 1136, and program data 1138. The operating system 1132 may be any suitable operating system or combination of operating systems. By way of example, the application programs 1134 and program modules 1136 can include a recognition scheme in accordance with an aspect of the subject invention.

A user can enter commands and information into the computer 1102 through one or more user input devices, such as a keyboard 1140 and a pointing device (e.g., a mouse 1142). Other input devices (not shown) may include a microphone, a joystick, a game pad, a satellite dish, a wireless remote, a scanner, or the like. These and other input devices are often connected to the processing unit 1104 through a serial port interface 1144 that is coupled to the system bus 1108, but may be connected by other interfaces, such as a parallel port, a game port or a universal serial bus (USB). A monitor 1146 or other type of display device is also connected to the system bus 1108 via an interface, such as a video adapter 1148. In addition to the monitor 1146, the computer 1102 may include other peripheral output devices (not shown), such as speakers, printers, etc.

It is to be appreciated that the computer 1102 can operate in a networked environment using logical connections to one or more remote computers 1160. The remote computer 1160 may be a workstation, a server computer, a router, a peer device or other common network node, and typically includes many or all of the elements described relative to the computer 1102, although for purposes of brevity, only a memory storage device 1162 is illustrated in FIG. 11. The logical connections depicted in FIG. 11 can include a local area network (LAN) 1164 and a wide area network (WAN) 1166. Such networking environments are commonplace in offices, enterprise-wide computer networks, intranets and the Internet.

When used in a LAN networking environment, for example, the computer 1102 is connected to the local network 1164 through a network interface or adapter 1168. When used in a WAN networking environment, the computer 1102 typically includes a modem (e.g., telephone, DSL, cable, etc.) 1170, or is connected to a communications server on the LAN, or has other means for establishing communications over the WAN 1166, such as the Internet. The modem 1170, which can be internal or external relative to the computer 1102, is connected to the system bus 1108 via the serial port interface 1144. In a networked environment, program modules (including application programs 1134) and/or program data 1138 can be stored in the remote memory storage device 1162. It will be appreciated that the network connections shown are exemplary and other means (e.g., wired or wireless) of establishing a communications link between the computers 1102 and 1160 can be used when carrying out an aspect of the subject invention.

In accordance with the practices of persons skilled in the art of computer programming, the subject invention has been described with reference to acts and symbolic representations of operations that are performed by a computer, such as the computer 1102 or remote computer 1160, unless otherwise indicated. Such acts and operations are sometimes referred to as being computer-executed. It will be appreciated that the acts and symbolically represented operations include the manipulation by the processing unit 1104 of electrical signals representing data bits which causes a resulting transformation or reduction of the electrical signal representation, and the maintenance of data bits at memory locations in the memory system (including the system memory 1106, hard drive 1116, floppy disks 1120, CD-ROM 1124, and remote memory 1162) to thereby reconfigure or otherwise alter the computer system's operation, as well as other processing of signals. The memory locations where such data bits are maintained are physical locations that have particular electrical, magnetic, or optical properties corresponding to the data bits.

Figure 12:
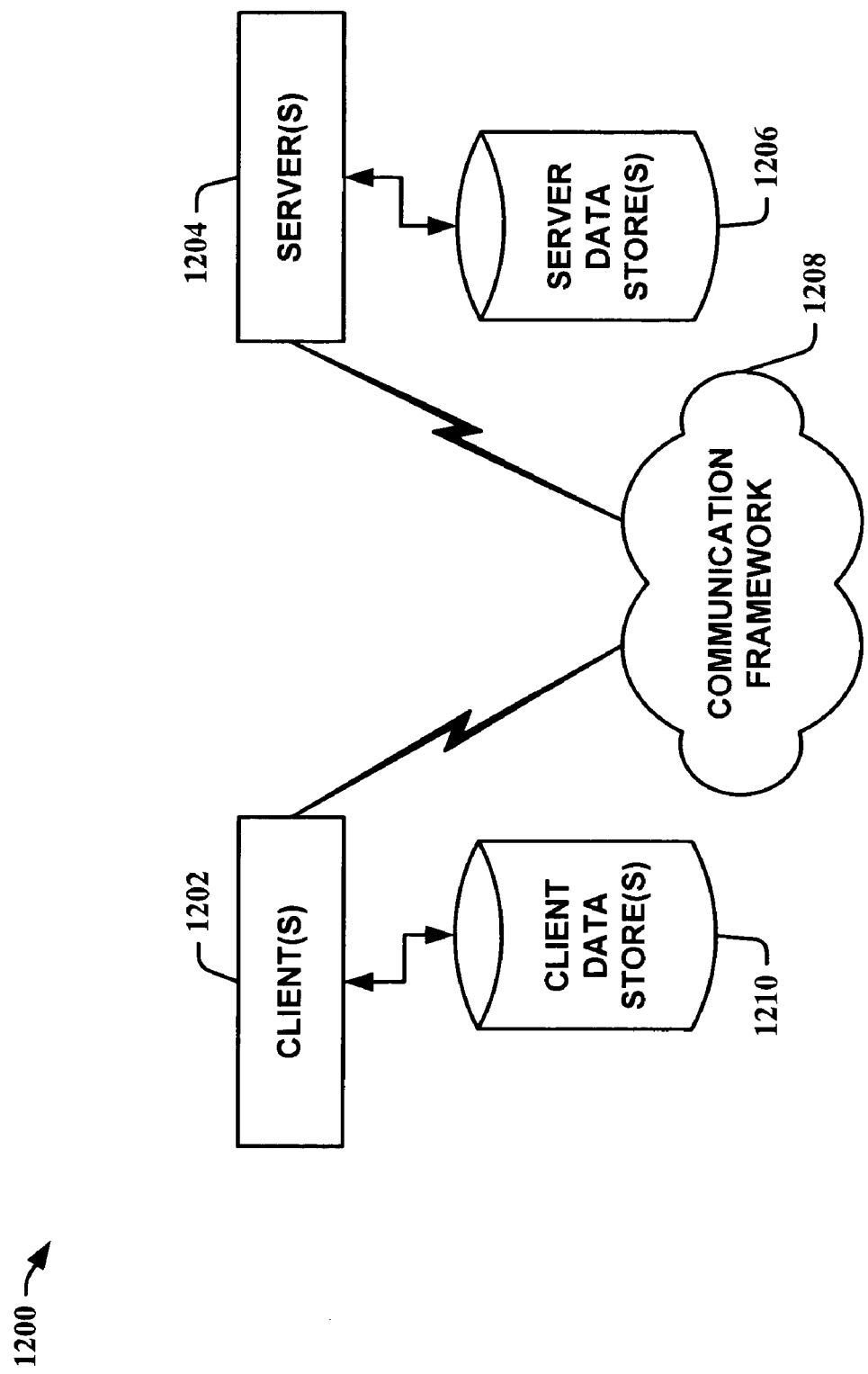
FIG. 12 illustrates another example operating environment in which the subject invention can function.

FIG. 12 is another block diagram of a sample computing environment 1200 with which the subject invention can interact. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). One possible communication between a client 1202 and a server 1204 may be in the form of a data packet adapted to be transmitted between two or more computer processes. The system 1200 includes a communication framework 1208 that can be employed to facilitate communications between the client(s) 1202 and the server(s) 1204. The client(s) 1202 are connected to one or more client data store(s) 1210 that can be employed to store information local to the client(s) 1202. Similarly, the server(s) 1204 are connected to one or more server data store(s) 1206 that can be employed to store information local to the server(s) 1204.

It is to be appreciated that the systems and/or methods of the subject invention can be utilized in recognition facilitating computer components and non-computer related components alike. Further, those skilled in the art will recognize that the systems and/or methods of the subject invention are employable in a vast array of electronic related technologies, including, but not limited to, computers, servers and/or handheld electronic devices, and the like.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system including a processor communicatively coupled to a memory that facilitates recognition of 2-dimensional images, comprising:
   a receiving component that receives an input associated with a two-dimensional structure; and
   a grammar component that utilizes image recognition to facilitate in grammatically parsing the input wherein the grammar component utilizes a constellation of integral images to facilitate in parsing the input, the constellation of integral images representing a physical orientation of features in the input, the physical orientation of the features include at least one of vertical alignment of bounding boxes in the input or horizontal alignment of text lines in the input.

2. The system of claim 1, the grammar component employs the image recognition to facilitate in scoring at least one parse tree and/or subtree associated with the input.

3. The system of claim 1, the grammar component renders at least one tree and/or subtree as an image to facilitate in parsing the input.

4. The system of claim 1, the grammar component renders a stroke curvature and/or a nearby white space as an image to facilitate in parsing the input.

5. The system of claim 1, the grammar component employs at least one geometric constraint to facilitate in parsing the input in polynomial time.

6. The system of claim 1, the grammar component utilizes at least one integral image of at least one feature of the input to facilitate in parsing the input.

7. The system of claim 1, the two-dimensional structure comprising an equation and/or a document layout.

8. The system of claim 1, the grammar component utilizes a grammatical parsing process based on, at least in part, a discriminative grammatical model.

9. The system of claim 1, the grammar component employs at least one classifier to facilitate in recognizing and/or scoring an image.

10. The system of claim 9, the grammar component employs the classifier to facilitate in determining a grammatical cost parse tree and/or a sub-parse tree.

11. A method for facilitating recognition of 2-dimensional images, comprising:
    receiving an input associated with a two-dimensional structure; and
    utilizing image recognition of at least a constellation of integral images to facilitate in grammatically parsing the input, each of the integral images includes a plurality of pixels, wherein each of integral images stores all values up and to the left of one or more pixels in the corresponding plurality of pixels.

12. The method of claim 11 further comprising:
    rendering a stroke curvature and/or a nearby white space as an image to facilitate in parsing the input.

13. The method of claim 11 further comprising:
    employing at least one geometric constraint to facilitate in parsing the input in polynomial time.

14. The method of claim 11 further comprising:
    employing at least one integral image of at least one feature of the input to facilitate in parsing the input.

15. The method of claim 11 further comprising:
    parsing the input based on a grammatical cost function; the grammatical cost function derived, at least in part, via a machine learning technique that incorporates image recognition to facilitate in determining an optimal parse from a global search.

16. The method of claim 11, the grammatical parsing process based on a discriminative grammatical model.

17. The method of claim 11, the two-dimensional structure comprising an equation and/or a document layout.

18. A system that facilitates recognition of 2-dimensional images, comprising:
 means for receiving an input associated with a two-dimensional structure; and
 means for grammatically parsing the input utilizing, at least in part, image recognition of at least a constellation of integral images to facilitate in a parsing process, the constellation of integral images representing a physical orientation of features in the input, the physical orientation of the features include at least one of vertical alignment of bounding boxes in the input or horizontal alignment of text lines in the input.

19. The system of claim 1, wherein each of the integral images includes a plurality of pixels, wherein each of integral images stores all values up and to the left of one or more pixels in the corresponding plurality of pixels.

20. The method of claim 11, wherein the constellation of integral images representing a physical orientation of features in the input, the physical orientation of the features include at least one of vertical alignment of bounding boxes in the input or horizontal alignment of text lines in the input.

* * * * *